United States Patent [19]

Yamaguchi et al.

[11] Patent Number: 4,670,320

[45] Date of Patent: Jun. 2, 1987

[54] ALUMINA FORMED BODY AND METHOD FOR ITS MANUFACTURE

[75] Inventors: Masayoshi Yamaguchi; Kazunori Meguro; Shuitsu Matsuo, all of Oguni; Yasumi Sasaki, Nagai, all of Japan

[73] Assignee: Toshiba Ceramics Co., Ltd., Tokyo, Japan

[21] Appl. No.: 855,402

[22] Filed: Apr. 24, 1986

[30] Foreign Application Priority Data

May 21, 1985 [JP] Japan .............................. 60-106939
May 21, 1985 [JP] Japan .............................. 60-106938
May 21, 1985 [JP] Japan .............................. 60-106934

[51] Int. Cl.$^4$ .................. B32B 3/00; B32B 19/00; B32B 5/14; B44C 1/22
[52] U.S. Cl. .................................. 428/141; 156/656; 156/657; 427/309; 427/399; 427/444; 428/307.3; 428/307.7; 428/312.8; 428/409; 428/689
[58] Field of Search ............... 156/655, 656, 657; 427/309, 352, 399, 444; 428/141, 307.3, 307.7, 312.6, 312.8, 409, 689, 701, 699

[56] References Cited

U.S. PATENT DOCUMENTS

| 3,816,222 | 6/1974 | Plumat et al. | 428/409 |
| 3,817,781 | 6/1974 | Church et al. | 428/409 |
| 4,135,012 | 1/1979 | Su | 427/309 |
| 4,143,182 | 3/1979 | Henney et al. | 427/399 |
| 4,159,357 | 6/1979 | Grunke | 427/399 |
| 4,344,222 | 8/1982 | Bergeron et al. | 29/589 |

Primary Examiner—William J. Van Balen
Attorney, Agent, or Firm—Schwartz, Jeffery, Schwaab, Mack, Blumenthal & Evans

[57] ABSTRACT

An alumina formed body comprising many long alumina elements oriented in random directions and interconnected so as to constitute a porous matrix comprising a large number of fine pores. Such a body is manufactured by reacting a glass-formed body comprising silica with aluminum at high temperature to form an alumina composite material comprising alumina, aluminum and silicon and removing aluminum and silicon from the aluminum composite material.

23 Claims, 8 Drawing Figures

ALUMINA FORMED BODY AND METHOD FOR ITS MANUFACTURE

BACKGROUND OF THE INVENTION

This invention relates to a formed alumina body and to a method for manufacturing the same, particularly, to an improved porous alumina body and an alumina compound material.

An alumina ceramic material has excellent hardness, mechanical strength, heat resistance and chemical stability. The heat resistance thereof is not inferior to other ceramic materials such as silicon carbide and silicon nitride. In addition, alumina ceramic materials are inexpensive. Therefore, alumina ceramic materials are widely used as industrial ceramic materials as described by Japanese Published Patent Application No. 54-87716.

Alumina ceramic products are conventionally made by forming fine alumina particles in desired shape and then firing the formed shape, or forming and firing fine alumina particles at the same time as described by Japanese Published Patent Application No. 57-95870 or Japanese Patent Publication No. 59-25748. In conventional alumina ceramic materials, a matrix is formed of alumina particles simple shapes.

Conventional alumina ceramic materials have the following disadvantages:

(1) The workability is bad due to their hardness.
(2) The shock resistance is weak because of their brittleness. Generally speaking, the shock break resistance of alumina ceramic materials is inferior to that of metals.
(3) It is difficult to form products with complex shapes exactly.
(4) The firing temperature is a high temperature on the order of 1500° C. to 1900° C.
(5) The shrinkage on firing is large.
(6) The thermal shock resistance is low.
(7) The lubricity is poor compared with that of metals.

Because of these disadvantages, although alumina ceramic materials have many excellent basic characteristics, they cannot be used satisfactorily as structural materials which must satisfy severe strength and mechanical reliability requirements.

SUMMARY OF THE INVENTION

The object of this invention is to provide a formed alumina body which has excellent strength and high mechanical reliability.

Another object of this invention is to provide a porous alumina body which can be formed to complicated pore shapes.

Still another object of this invention is to provide an alumina compound material which has high strength and excellent mechanical characteristics.

A further object of this invention is to provide a method of manufacturing a formed alumina body in which any complex shape can be obtained easily and at low production cost.

These and other objects are achieved according to this invention by providing a formed alumina body which comprises a plurality of elongated alumina elements oriented in random directions and interconnected so as to constitute a porous matrix containing a large number of fine pores.

According to another aspect of the invention the foregoing objects are achieved by providing a method for manufacturing a formed alumina body which comprises the steps of reacting a glass-formed body comprising silica with aluminum so as to form an alumina composite body comprising alumina, aluminum and silicon, and removing aluminum and silicon from the alumina composite body.

Further objects, features and advantages of this invention will become apparent from the following description of preferred embodiments when considered together with the accompanying drawings.

DETAILED DESCRIPTION OF PREFERRED EMBODIMENTS

Figure 1:
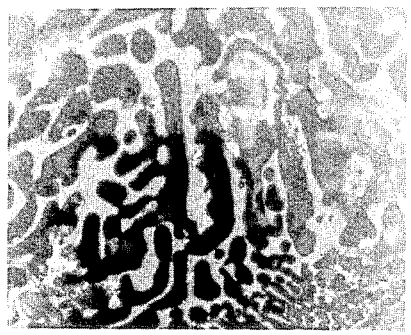
FIG. 1 is a photomicrograph at 800 magnifications showing a section of the fine structure of an alumina-aluminum-silicon composite material for use in the method of the invention.

The general method for manufacturing an alumina formed body according to this invention is as follows:

First, a formed glass body comprising silica ($SiO_2$) such as a formed body made of quartz glass is prepared. If desired, the glass body may be worked so as to have a desired shape. Thereafter, the glassformed body is immersed in molten aluminum (Al) of at least 99% purity, desirably at least 99.9% purity, under a vacuum of from about 10 to 15 torr or in an inert gas atmosphere.

The aluminum and silica react according to the following equation:

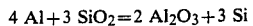

$$4\,Al + 3\,SiO_2 = 2\,Al_2O_3 + 3\,Si$$

so that silica in the glass-formed body is changed into alumina ($Al_2O_3$). As a result, an alumina composite body comprising alumina and a solid solution of aluminum and silicon is produced. After that, the alumina composite body is taken out of the molten aluminum and then heated for from about 30 to 120 minutes under vacuum of from about 10 to 15 torr at a temperature of, for instance, from about 780° to 950° C., which is higher than the melting point of aluminum by about 30° to 200° C. Any excess molten aluminum on the surface of the alumina composite body is thereby vaporized so as to be removed, and any unreacted silica which remains is reacted with aluminum. At the same time, the strain in the alumina composite body is eliminated. Finally, the solid solution of alumina and silicon is removed by treating the body with an etching agent.

According to an alternative method, high purity aluminum is vapor-deposited onto the glass-formed body mentioned above under a vacuum of from about 10 to 15 torr or in an inert gas atmosphere. The aluminum desirably has a purity of 99.9%. The aluminum and silica react according to the following equation:

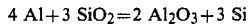

so that silica in the glass-formed body is changed into alumina. As a result, an alumina composite body comprising alumina and a solid solution of aluminum and silicon is produced. Finally, the solid solution of aluminum and silicon is removed by treatment with an etching agent.

In the methods described above, the formed alumina body may be further fired at a temperature of from about 1400° to 2000° C. after the removal of the solid solution of aluminum and silicon. The formed alumina body thereby attains a higher density and has a higher strength. If desired, the formed alumina body may be impregnated with a metal oxide, metal nitride, metal carbide, metal or a mixture of two or more of the foregoing and then may be fired at a temperature of from about 1400° to 2000° C. Examples of suitable impregnating materials include silica ($SiO_2$), alumina ($Al_2O_3$), magnesium oxide (MgO), silicon nitride ($Si_3N_4$), aluminum nitride (AlN), titanium nitride (TiN), silicon carbide (SiC), boron carbide ($B_4C$) and/or silicon (Si).

The resultant formed alumina body comprises many elongated alumina elements oriented in random directions and interconnected so as to constitute a porous alumina matrix as a whole. The alumina elements have complicated shapes and are interconnected to form a three-dimensionally cross-linked structure. Also, the porous alumina matrix has a large number of fine pores having an average pore radius of from about 0.5 micron to 1.5 microns. At least 90% of the fine pores have a pore radius of from about 0.1 micron to 10 microns. And the porous alumina matrix has an apparent porosity of 20 to 30%, or, if it is subsequently fired at temperatures of from 1400° to 2000° C., of 0 to 15%.

In this invention, the glass-formed body comprises a silica ($SiO_2$) material such as quartz glass. If desired, the glass-formed body may include other oxides such as alumina ($Al_2O_3$), sodium oxide ($Na_2O$) and/or calcium oxide (CaO). Also, the glass-formed body may be a single piece, a bundle of fibers, a bundle of whiskers, or the like, comprising silica.

The invention is illustrated in further detail by the following examples:

EXAMPLE 1

Figure 8:
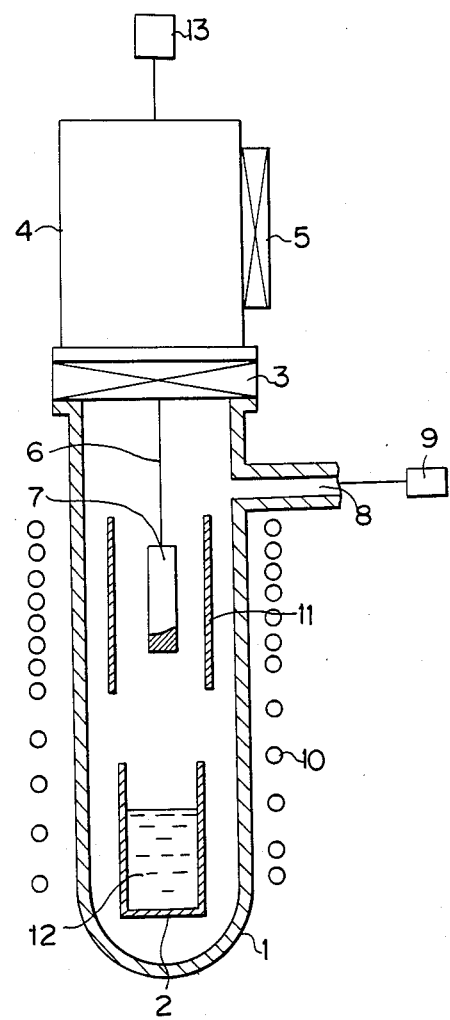
FIG. 8 is a schematic view showing another reaction furnace for use in the method of this invention.

FIG. 8 shows schematically one example of a reaction furnace for producing an alumina composite body which comprises alumina, aluminum and silicon. Reaction furnace 1, which is made of quartz glass, is open at its top and closed at its bottom. A crucible 2 made of high purity carbon is arranged within reaction furnace 1. A shutter 3 is placed on top of reaction furnace 1, and an entrance portion 4 is placed on the shutter 3. Another shutter 5 is positioned at one side of entrance portion 4. Holding means, such as line 6, extends vertically through entrance portion 4 and shutter 3. An upper portion of the holding means 6 is joined to a vertical actuation mechanism 13 so that the holding means 6 can move up and down. The lower portion of the holding means 6 is designed to hold a glass-formed body 7. An outlet 8 is formed at one side toward the top of reaction furnace 1 and connected to a vacuum pump 9. A heater 10 having a spiral configuration is arranged outside the reaction furnace 1. The spacing between the heater coils near the crucible 2 is greater than the spacing of the coils above the crucible whereby the region above the crucible 2 can be heated to a higher temperature. A tube 11 made of high-purity carbon is disposed within the higher temperature region. Crucible 2 is filled with molten aluminum 12 of 99.9% purity.

First, a glass body 7 was prepared comprising a single piece of quartz glass formed in cylindrical shape. Shutter 5 was opened, and formed glass body 7 was attached to the lower portion of holding means 6 in entrance portion 4. Then shutter 5 was closed. Next, shutter 3 was opened, and the glass body 7 was lowered into the molten aluminum 12 at a temperature of 750° C. The formed glass body 7 was immersed in the 99.9% pure molten aluminum 12 under vacuum. The aluminum and silica reacted according to the following equation:

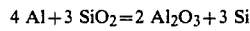

so that silica is formed glass body 7 was changed into alumina. Thereby, an alumina composite body comprising alumina, aluminum and silicon was obtained. After that, holding means 6 was raised to lift the alumina composite body out of the molten aluminum 12. Next, the alumina composite body was moved up to a position within tube 11, and heated at a temperature of 800° C. for 50 minutes. The alumina composite body was subsequently moved up into entrance portion 4. After that, shutter 3 was closed; shutter 5 was opened, and then the alumina composite body was removed from holding means 6. At this time the alumina composite body had the structure shown in FIG. 1, which is a photomicrograph at 800 magnifications.

Figure 2:
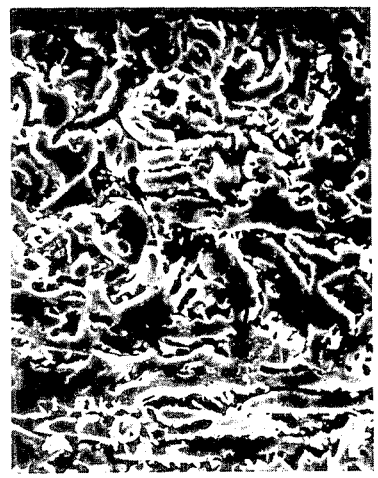
FIG. 2 is a photomicrograph at 1000 magnifications showing a porous alumina body according to the invention.
Figure 3:
FIG. 3 is a photomicrograph at 2000 magnifications showing a porous alumina body according to the invention.
Figure 4:
FIG. 4 is a photomicrograph at 7000 magnifications showing a porous alumina body according to the invention.

The alumina composite body comprising alumina, aluminum and silicon was further processed by treating it with an etching agent at a temperature of 20° C. for 5 hours so that the solid solution of aluminum and silicon was removed. A useful etching may be made, for example, by mixing hydrogen fluoride (HF), nitric acid ($HNO_3$) and water ($H_2O$) in a 1:1:1 ratio. The solid solution of aluminum and silicon was completely removed by the etching agent thereby producing the alumina formed body of this invention. The resultant alumina formed body had a porous structure as shown in FIGS. 2, 3 and 4, which are photomicrographs at 1000, 2000 and 7000 magnifications, respectively. As apparent from FIGS. 2, 3 and 4, the formed alumina body comprised many long alumina elements oriented in random directions and interconnected so as to constitute a porous matrix as a whole. Also, the alumina elements had complicated shapes and were interconnected to form a three-dimensionally cross-linked structure.

Figure 6:
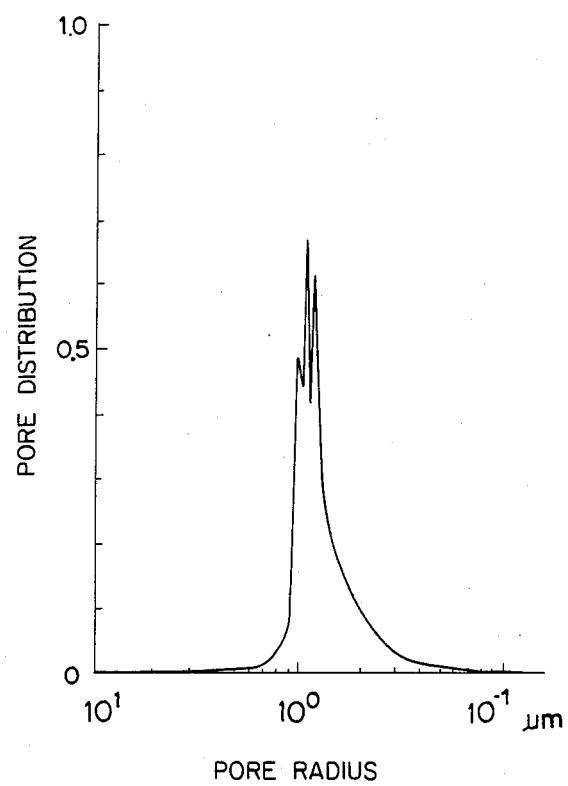
FIG. 6 is a graph showing pore characteristics of a porous alumina body according to the invention.

FIG. 6 shows the pore distribution of the porous alumina formed body. According to FIG. 6, the porous alumina formed body had fine pores, the radii of which ranged between 0.1 micron and 10 microns, and an average pore radius which was between 0.9 micron and 1 micron. Also, the resultant formed alumina body exhibited a high bending strength of 100 MPa and an apparent porosity of 25% by means of Archimedes method with water.

EXAMPLE 2

A porous alumina formed body, produced as described in Example 1, was used as a matrix and immersed in colloidal silica so that the alumina matrix was impregnated with silica. The impregnated alumina formed body was then fired at a temperature of 1700° C. for 120 minutes. As a result, an alumina compound material was obtained as shown in FIG. 5.

Figure 5:
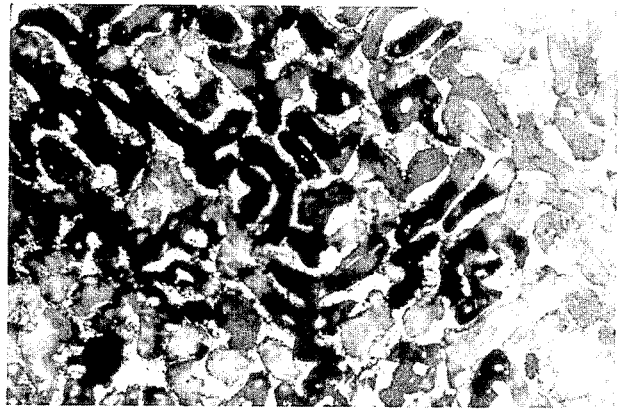
FIG. 5 is a photomicrograph showing an alumina compound body according to the invention.

FIG. 5 is a photomicrograph showing the fine structure of the alumina compound material according to this invention. As apparent from FIG. 5, the alumina compound material comprises an alumina matrix constituted by many long alumina elements 15 and silica 16 impregnated in the alumina matrix. The resultant alumina compound material exhibited a high bending strength of 300 MPa.

EXAMPLE 3

A formed alumina body was prepared as described in Example 1. The formed alumina body was thereafter fired at a temperature of 1700° C. for 2 hours. The resulting formed alumina body had a high bending strength of 250 MPa and an apparent porosity of 5% by means of Archimedes method with water.

EXAMPLE 4

Figure 7:
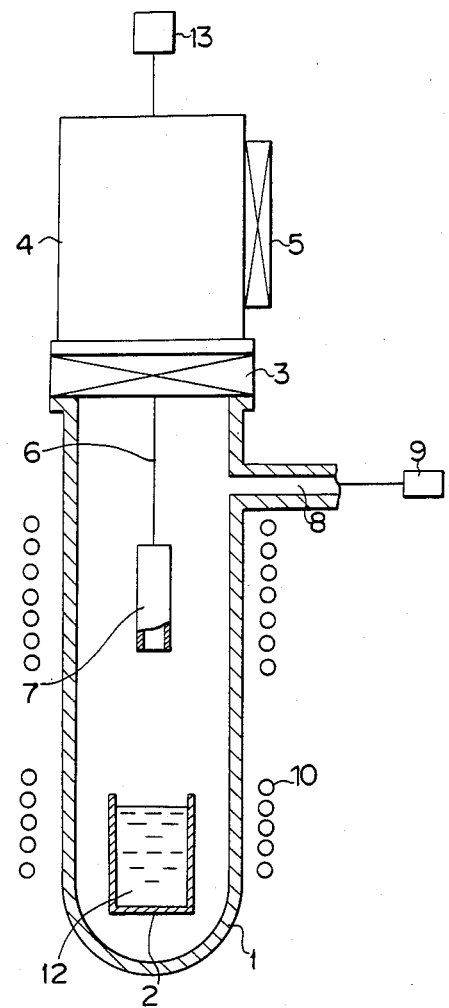
FIG. 7 is a schematic view showing a reaction furnace for use in the method of the invention.

FIG. 7 schematically illustrates an example of a vapor-depositing apparatus for producing a formed alumina body according to the invention. A reaction furnace 1, made of quartz glass, is open at its top and closed at its bottom. A crucible 2 made of high purity carbon is arranged within the reaction furnace. A shutter 3 is placed on top of reaction furnace 1, and an entrance portion 4 is placed on the shutter 3. Another shutter 5 is positioned at one side of entrance portion 4. A holding means, such as line 6, extends vertically through entrance portion 4 and shutter 3. An upper portion of holding means 6 is connected to a vertical actuation mechanism 13, and the lower end of holding means 6 is designed to hold a glass-formed body 7. An outlet 8 is formed at one side toward the top of reaction furnace 1 and connected to a vacuum pump 9. In addition, a spiral heater element 10 is arranged outside the reaction furnace 1, particularly, outside the crucible 2 and the region above the crucible. Crucible 2 is filled with molten aluminum 12 having a purity of 99.9%.

First, a glass-formed body 7 consisting of a single, tubular piece of quartz glass was prepared. Shutter 5 was opened; glass-formed body 7 was attached to the lower end of holding means 6, and then shutter 5 was closed. Shutter 3 was then opened, and the glass-formed body 7 was lowered to a position above crucible 2 as shown in FIG. 7. The glass-formed body 7 was maintained at a temperature of 900° C. under a vacuum of 16 torr in reaction furnace 1. The high purity molten aluminum 12 was heated at a temperature of 1200° C. and vaporized so that aluminum was vapor deposited on glass-formed body 7 for 60 minutes. The aluminum and silica reacted according to the following equation:

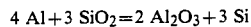

$$4\ Al + 3\ SiO_2 = 2\ Al_2O_3 + 3\ Si$$

so that silica in the glass-formed body 7 was changed into alumina, and an alumina composite body was obtained. After that, holding means 6 was raised until the alumina composite body was received in entrance portion 4. Then shutter 3 was closed; shutter 5 was opened, and the alumina composite body was detached from holding means 6. The resulting alumina composite body comprised alumina, aluminum and silicon. The alumina composite body was further processed by treatment with an etching agent so that the solid solution of aluminum and silicon was removed. The etching agent was made by mixing hydrogen fluoride (HF), nitric acid (HNO$_3$) and water (H2O) in a 1:1:1 ratio. The solid solution of aluminum and silicon was completely removed by the etching agent thereby producing the alumina formed body of this invention.

The resultant formed alumina body comprised many long alumina elements oriented in random directions and interconnected so as to constitute a porous matrix as a whole, similar to the product of Example 1. Also, the alumina elements had complicated shapes and were interconnected to form a three-dimensionally cross-linked structure. The formed alumina body exhibited a high bending strength of 100 MPa and an apparent porosity of 25% by means of Archimedes method with water.

As described above, the formed alumina body of the invention can be easily produced even in complicated shapes because a glass-formed body is used as a starting material. The formed alumina product has excellent mechanical strength and good abrasion resistance. Also, in comparison with metals, the specific gravity of the formed alumina body of the invention is remarkably low. Accordingly, the formed alumina body of the invention can be used as a porous body for filters, catalyst supports, or the like or as a composite material for ceramic engines, bulletproof jackets, armor plates for a tank, golf club faces, bioceramics or the like.

The foregoing description and examples have been set forth merely to illustrate the invention and are not intended to be limiting. Since modifications of the described embodiments incorporating the spirit and substance of the invention may occur to persons skilled in the art, the scope of the invention is to be limited solely with respect to the appended claims and equivalents.

What is claimed is:

1. A formed alumina body comprising a plurality of elongated alumina elements oriented in random directions and interconnected so as to constitute a porous matrix containing a large number of fine pores having an average pore radius of from about 0.5 micron to about 1.5 microns.

2. A formed alumina body according to claim 1, wherein at least about 90% of said fine pores have a pore radius of from about 0.1 micron to 10 microns.

3. A formed alumina body according to claim 1, which has an apparent porosity of less than about 30%.

4. A formed alumina body according to claim 3, which has an apparent porosity of less than about 15%.

5. A formed alumina body according to claim 3, which has an apparent porosity of from about 20% to 30%.

6. A formed alumina body according to claim 1, wherein a material comprising metal oxide, metal nitride, metal carbide or metal is provided in said porous matrix.

7. A formed alumina body according to claim 6, wherein said material is selected from the group consisting of silica, alumina, magnesium oxide, silicon nitride, aluminum nitride, titanium nitride, silicon carbide, boron carbide and silicon.

8. A method of manufacturing a formed alumina body comprising the steps of:

reacting a glass-formed body comprising silica with aluminum so as to form an alumina composite body comprising alumina, aluminum and silicon; and removing aluminum and silicon from said alumina composite body.

9. A method of manufacturing a formed alumina body according to claim 8, wherein said reacting step is carried out under a vacuum of from about 10 to 15 torr.

10. A method of manufacturing a formed alumina body according to claim 8, wherein said reacting step is carried out in an inert gas atmosphere.

11. A method of manufacturing a formed alumina body according to claim 8, further comprising the step of firing the resulting body at a temperature of from about 1400° to 2000° C. after said removing step.

12. A method of manufacturing an alumina formed body according to claim 8, wherein said body comprises a porous matrix, further comprising the step of impregnating material comprising metal oxide, metal nitride, metal carbide or metal into said porous matrix.

13. A method of manufacturing a formed alumina body according to claim 12, wherein said material is selected from the group consisting of silica, alumina, magnesium oxide, silicon nitride, aluminum nitride, titanium nitride, silicon carbide, boron carbide and silicon.

14. A method of manufacturing a formed alumina body according to claim 8, wherein said glass-formed body comprises quartz glass.

15. A method of manufacturing a formed alumina body according to claim 8, wherein said glass-formed body is selected from the group consisting of a single piece, a bundle of fibers or a bundle of whiskers.

16. A method of manufacturing a formed alumina body according to claim 8, wherein said removing step is carried out by treatment with an etching agent.

17. A method of manufacturing a formed alumina body according to claim 8, wherein said reacting step is carried out by immersing said glass-formed body in molten aluminum.

18. A method for manufacturing a formed alumina body according to claim 17, wherein said aluminum has a purity of at least 99%.

19. A method of manufacturing a formed alumina body according to claim 18, wherein said aluminum has a purity of at least 99.9%.

20. A method of manufacturing a formed alumina body according to claim 17, further comprising heating said alumina body at a temperature of from about 780° to 950° C.

21. A method of manufacturing a formed alumina body according to claim 8, wherein said reacting step is carried out by vapor-depositing aluminum onto said glass-formed body.

22. A method of manufacturing a formed alumina body according to claim 21, wherein said aluminum has a purity of at least 99%.

23. A method of manufacturing a formed alumina body according to claim 22, wherein said aluminum has a purity of at least 99.9%.

* * * * *